(12) United States Patent
Seo et al.

(10) Patent No.: US 7,726,391 B2
(45) Date of Patent: Jun. 1, 2010

(54) AIR CONDITIONER FOR VEHICLE

(75) Inventors: Yong-Eun Seo, Daedeok-gu (KR);
Sang-Chul Byun, Daedeok-gu (KR);
Sung-Ho Kang, Daedeok-gu (KR);
Seong-Seok Han, Daedeok-gu (KR);
Yong-Sang Kim, Daedeok-gu (KR)

(73) Assignee: Halla Climate Control Corp., Daejeon-si (KR)

( * ) Notice: Subject to any disclaimer, the term of this patent is extended or adjusted under 35 U.S.C. 154(b) by 1162 days.

(21) Appl. No.: 11/340,566

(22) Filed: Jan. 27, 2006

(65) Prior Publication Data
US 2006/0175050 A1 Aug. 10, 2006

(30) Foreign Application Priority Data
Feb. 1, 2005 (KR) .................. 10-2005-0009205
Jun. 17, 2005 (KR) .................. 10-2005-0052387

(51) Int. Cl.
*B60H 1/00* (2006.01)
*B60H 3/00* (2006.01)

(52) U.S. Cl. .................. 165/202; 165/42; 165/43; 165/70; 165/203; 165/204; 454/121; 454/126; 454/156; 454/160; 454/161; 237/12.3 A; 237/12.3 B

(58) Field of Classification Search .................. 165/202, 165/42, 43, 203, 204, 70; 454/156, 121, 454/126, 160, 161; 237/12.3 A, 12.3 B
See application file for complete search history.

(56) References Cited

U.S. PATENT DOCUMENTS

| 5,042,566 A | 8/1991 | Hildebrand |
| 5,862,677 A * | 1/1999 | Kim et al. .................. 165/42 |
| 6,482,081 B2 * | 11/2002 | Vincent et al. .................. 165/42 |
| 2005/0118944 A1* | 6/2005 | Vincent et al. .................. 454/156 |

FOREIGN PATENT DOCUMENTS

DE 102 53 854 4/2004

* cited by examiner

*Primary Examiner*—John K Ford
(74) *Attorney, Agent, or Firm*—Lowe Hauptman Ham & Berner LLP

(57) ABSTRACT

A vehicle air conditioner casing has defrost, face, and front seat floor vents variably communicating with a mixing chamber. Air passageways in the casing include an evaporator and heater core. A rear seat console vent communicates with a warm air passageway including the heater core and a cool air passageway through a console side cool air bypass passageway on the casing bottom surface, under the heater core. A front seat temperature adjusting door adjusts variably opens cool air passageway outlets and the warm air passageway with respect to the mixing chamber. A rear seat main temperature adjusting door variably opens warm air passageway inlets and the console side cool air bypass passageway. A rear seat auxiliary temperature variably adjusts the openings of warm air passageway outlets and the console cool air bypass passageway with respect to the rear seat console vent.

13 Claims, 12 Drawing Sheets

AIR CONDITIONER FOR VEHICLE

RELATED APPLICATIONS

The present application is based on, and claims priority from, Korean Application Number 10-2005-0052387, filed Feb. 1, 2005, the disclosures of which are hereby incorporated by reference herein in their entirety.

BACKGROUND OF THE INVENTION

1. Field of the Invention

The present invention relates to an air conditioner for a vehicle, and more particularly, to an air conditioner for a vehicle that is capable of independently conducting air conditioning control with respect to the four-way zone inside the vehicle, thereby effectively preventing cool air entering a rear seat console vent from being heated by means of a heater core during a full cooling mode.

2. Background of the Related Art

An air conditioner for a vehicle includes a cooling system functioning to cool the inside of the vehicle and a heating system functioning to heat the inside of the vehicle. The cooling system is configured in such a manner that refrigerants flowing in a circulating cycle of a condenser, a receiver dryer, an expansion valve, and an evaporator by the activation of a compressor is heat-exchanged with the air passing the surface of the evaporator by means of a blower and is thus changed into cool air which is discharged to the inside of the vehicle, thereby cooling the interior of the vehicle. On the other hand, the heating system is configured in such a manner where cooling water flows to the heater core and is heat-exchanged with the blowing air, thereby heating the interior of the vehicle.

Generally, the air conditioner for a vehicle has three types.

First, there is a three-piece type of air conditioner where a blower unit, an evaporator unit and a heat unit are separately formed and coupled to one another. In the case of this type, however, the size of system becomes bulky, which makes the space inside the vehicle substantially decreased and also makes the productivity undesirably low.

To ensure the efficient use of the space inside the vehicle, therefore, a compact air conditioner is needed. To meet such the necessity, recently, there is presented a semi-center type of air conditioner where an evaporator unit and a heater unit are integrally formed with each other. Otherwise, there is presented a center-mounting type of air conditioner where the blower unit, the evaporator unit, and the heater unit are formed integrally with one another.

FIG. 1 shows a conventional semi-center type of air conditioner for a vehicle, wherein the blower unit is not shown.

The conventional air conditioner for a vehicle includes: an air conditioner casing 10 having a defrost vent 12, a face vent 14, and a floor vent 16 formed at outlet sides thereof in such a manner as to be adjusted in their opening by means of respective mode doors 12d, 14d, and 16d; a blower (which is not shown) connected to an inlet of the air conditioner casing 10 for blowing inside air or outside air; an evaporator E and a heater core H each disposed at inside air passageways of the air conditioner casing 10; and a temperature adjusting door 20 adapted to adjust a degree of the opening of a cool air passageway P1 and a warm air passageway P2 of the air conditioner casing 10. The floor vent 16 is branched into a front vent 16f discharging air to front seats of the vehicle and a rear vent 16r discharging air to rear seats of the vehicle.

According to the conventional air conditioner for a vehicle under the above construction, if a cooling cycle is activated, the temperature adjusting door 20 is moved to a position shown by a dotted line as shown in FIG. 1 and opens the cool air passageway P1, while closing the warm air passageway P2. Thus, the air that is blown by the blower is passed through the surface of the evaporator E and heat-exchanged to refrigerant flowing the interior of the evaporator E. As a result, the air is changed into cool air and flows toward the cool air passageway P1 in a direction of the dotted line as shown in FIG. 1. Finally, the cool air is discharged through a vent that is opened by a given air discharging mode toward the inside of the vehicle, thereby conducting the cooling with respect to the inside of the vehicle.

On the other hand, if a heating cycle is activated, the temperature adjusting door 20 is moved to a position shown by a solid line as shown in FIG. 1 and closes the cool air passageway P1, while opening the warm air passageway P2. In this case, the activation of the cooling cycle through the evaporator E stops. As a result, the air that is blown by the blower is passed toward the heater core H through the warm air passageway P2 in a direction of the solid line as shown in FIG. 1 and is heat-exchanged into cooling water flowing the interior of the heater core H. Finally, the warm air is discharged through a vent that is opened by a given air discharging mode toward the inside of the vehicle, thereby conducting the heating with respect to the inside of the vehicle.

According to the conventional air conditioner for a vehicle as shown in FIG. 1, by the way, in a case where the cooling cycle is activated to an air discharging mode where the floor vent 16 is opened, hot cooling water flows to the inside of the heater core H, and since the floor vent 16 is disposed at the rear side of the heater core H, the air discharged through the floor vent 16 is heated by the heater core H, which undesirably makes the cooling performance greatly decreased. Furthermore, the temperature adjusting door 20 is turned between the evaporator E and the heater core H, and the evaporator E and the heater core H are disposed vertically, such that the whole size of the air conditioner becomes large.

According to the conventional air conditioner for a vehicle as shown in FIG. 1, moreover, there is provided a left and right partitioning wall (which is not shown) defining the left and right space portions with respect to the inside air passageways of the air conditioner casing 10, and in a case where doors in the left and right space portions are adjusted in their opening, the cooling and heating control with respect to the left and right space portions at the inside of the vehicle can be independently conducted. However, since the front vent 16f and the rear vent 16r communicate with each other, the cooling and heating control with respect to the front and back space portions at the inside of the vehicle can not be independently conducted.

To solve the problems the conventional air conditioner for a vehicle as shown in FIG. 1 has, therefore, there is presented another conventional air conditioner for a vehicle as shown in FIG. 2, which is disclosed in Korean Patent Publication Laid-open No. 2004-31601.

The conventional air conditioner for a vehicle as shown in FIG. 2 includes: an air conditioner casing 100 having a blower (which is not shown) connected to an inlet side thereof and a defrost vent 120, a face vent 122, a front seat floor vent 124, a rear seat floor vent 126 formed at outlet sides thereof in such a manner as to be adjusted in their opening by means of respective mode doors 120d, 122d, 124d and 126d; an evaporator E and a heater core H each disposed at inside air passageways of the air conditioner casing 100; a console side cooling air bypass passageway P3 formed under a warm air passageway P2 for making a cool air passageway P1 communicating with the rear seat console vent 126; first and second cool air adjusting doors 130 and 132 adapted to adjust a degree of the opening of an outlet of the cool air passageway P1 and an inlet of the warm air passageway P2; a third cool air adjusting door 134 adapted to adjust a degree of the opening of the inlet of the warm air passageway P2 and the inlet of the console side cool air bypass passageway P3; a first temperature adjusting door 140 adapted to adjust a degree of the opening of an outlet of the warm air passageway P2 with respect to a mixing chamber MC of the air conditioner casing 100; and a second temperature adjusting door 142 adapted to adjust a degree of the opening of the outlet of the warm air passageway P2 with respect to the rear seat console vent 126.

According to the conventional air conditioner for a vehicle as shown in FIG. 2, in a case where a full cooling mode is set in an air discharging mode where the rear seat console vent 126 is opened, the first and third cool air adjusting doors 130 and 134 are operated to close the inlet of the warm air passageway P2. Also, the outlet of the cool air passageway P1 is opened by means of the first and second cool air adjusting doors 130 and 132.

Thus, the cool air passageway P1 and the rear seat console vent 126 communicate with each other through the console side cool air bypass passageway P3. On the other hand, the first and second warm air adjusting doors 140 and 142 are operated to close the outlet of the warm air passageway P2. Thus, the rear seat console vent 126 does not communicate with the warm air passageway P2. And, other vents 120, 122 and 124 are selectively opened according to the set air discharging mode.

At this state, if air enters the inlet 110 of the air conditioner casing 100 by means of the operation of the ventilator, the air is passed through the evaporator E and is changed into cool air. A part of cool air is passed through the cool air passageway P1 and the mixing chamber MC and through the vent opened according to the air discharging mode and is then discharged to the front seats at the inside of the vehicle. And, the rest of cool air is passed through the console side cool air bypass passageway P3 and the rear seat console vent 126 and is then discharged to the rear seats at the inside of the vehicle.

On the other hand, as shown in FIG. 3, there is provided a left and right partitioning wall 112 defining the left and right space portions with respect to the inside air passageways of the air conditioner casing 100, and in a case where doors in the left and right space portions are adjusted in their opening, the cooling and heating control with respect to the left and right space portions at the inside of the vehicle can be independently conducted. That is, the air conditioning in the four-way zone at the inside of the vehicle can be independently conducted.

According to the conventional air conditioner for a vehicle as shown in FIG. 2, by the way, since the console side cool air bypass passageway P3 just abuts against the lower portion of the heater core H, the cool air supplied from the console side cool air bypass passageway P3 is heated by the heat transmitted from the heater core H, such that compensating effect for making the raising temperature of the air discharged through the rear seat console vent 126 decreased becomes low. Moreover, since the lower end portion of the heater core H is protruded toward the console side cool air bypass passageway P3 to block a part of the passageway P3, the cool air becomes more heated by the heater core H, and also since an amount of air flowing through the console side cool air bypass passageway P3 becomes small, the temperature of air discharged through the rear seat console vent 126 is not adjusted effectively.

According to the conventional air conditioner for a vehicle as shown in FIG. 2, typically, since the air conditioner casing 100 has two divided left and right casings 100*a* and 100*b* (see FIG. 3) joined to each other or three divided left, right and lower casings jointed to one another, the warm air that is passed through the heater core H via a left and right joining part 114 of the left and right casings 100*a* and 100*b* is leaked toward the console side cool air bypass passageway P3 from the warm air passageway P2, which makes the temperature of the cool air discharging from the console side cool air bypass passageway P3 to the rear seat console vent 126 more raised.

Further, upon the activation of the full cooling mode, even though the outlet of the warm air passageway P2 is closed by the second warm air adjusting door 142 with respect to the rear seat console vent 126, the air is leaked from the warm air passageway P2 toward the rear seat console vent 126 through a gap between the sealing surface of the air conditioner casing 100 and the second warm air adjusting door 142.

Additionally, all of the five doors 130, 132, 134, 140, and 142 are operated for the temperature adjustment, and accordingly, an actuating device like an actuator for actuating each door is needed, which makes the number of parts greatly increased.

SUMMARY OF THE INVENTION

Accordingly, the present invention has been made in view of the above-mentioned problems occurring in the prior art, and it is an object of the present invention to provide an air conditioner for a vehicle that is capable of independently conducting air conditioning control with respect to the four-way zone inside the vehicle, thereby effectively preventing cool air entering a rear seat console vent from being heated by means of a heater core during a full cooling mode.

To accomplish the above object, according to an aspect of the present invention, there is provided an air conditioner for a vehicle including: an air conditioner casing having a defrost vent, a face vent, and a front seat floor vent formed at outlets thereof in such a manner as to communicate with a mixing chamber and be adjusted in a degree of the opening thereof by means of respective mode doors, having left and right casings jointed to each other in such a manner as to be separated into left and right portions, and having a lower casing coupled to the lower portions of the left and right casings; an evaporator and a heater core each disposed at inside air passageways of the air conditioner casing; a rear seat console vent adapted to communicate with a warm air passageway having the heater core disposed therein and to communicate with a cool air passageway through a console side cool air bypass passageway disposed along the bottom surface of the air conditioner casing under the lower side of the heater core; a front seat temperature adjusting door adapted to adjust a degree of the opening of the outlets of the cool air passageway and the warm air passageway with respect to the mixing chamber; a rear seat main temperature adjusting door adapted to adjust a degree of the opening of the inlets of the warm air passageway and the console side cool air bypass passageway; and a first rear seat auxiliary temperature adjusting door adapted to adjust a degree of the opening of the outlets of the warm air passageway and the console side cool air bypass passageway with respect to the rear seat console vent.

According to the present invention, the air conditioner for a vehicle further includes a leaking warm air discharging passageway disposed between the warm air passageway and the console side cool air bypass passageway in such a manner as to isolate the console side cool air bypass passageway from the warm air passageway, for discharging the warm air leaking through a left and right joining portion of the left and right casings from the warm air passageway to the outside of the air conditioner casing.

According to the present invention, the air conditioner for a vehicle further includes a second rear seat auxiliary temperature adjusting door adapted to adjust a degree of the opening of the warm air passageway with respect to the rear seat console vent.

In this case, the second rear seat auxiliary temperature adjusting door is operated to close the outlet of the warm air passageway in engagement with the rear seat main temperature adjusting door if the rear seat main temperature adjusting door closes the inlet of the warm air passageway, and opens the outlet of the warm air passageway with respect to the console vent if the rear seat main temperature adjusting door is operated to open the inlet of the warm air passageway.

Preferably, the first rear seat auxiliary temperature adjusting door has a center pivot structure.

Preferably, at the bottom of the inlet of the console side cool air bypass passageway is provided a first partition for preventing the pressure at an area between the evaporator and the console side cool air bypass passageway from being excessively varied by the operation of the rear seat main temperature adjusting door, the first partition having a condensed water through hole formed at the lower end thereof.

Preferably, at the bottom of the inlet of the console side cool air bypass passageway is provided a second partition for preventing water from overflowing backwardly when the vehicle is driven on hills. In this case, the second partition is formed in such a manner as to define the front and back sides of a condensed water discharging outlet formed at the console side cool air bypass passageway, for discharging the condensed water generated from the evaporator and flowing through the console side cool air bypass passageway to the outside of the air conditioner casing.

Further, a left and right partitioning wall is disposed between the left and right casings such that the internal space in the left and right casings is divided into left and right space portions.

Further, a left and right partitioning wall is disposed between the left and right casings in such a manner as to be passed through the middle portion of the lower casing such that the internal space of the left and right casings and the internal space of the lower casing are each divided into left and right space portions.

Preferably, if the inside air passageways of the air conditioner casing are divided into the left and right space portions by means of the left and right partitioning wall, each of the doors is disposed for independently adjusting a degree of the opening with respect to the air passageways divided in the left and right space portions of the air conditioner casing.

Preferably, the heater core is disposed at the warm air passageway in such a manner as to be inclined downwardly at the back portion thereof.

Preferably, the air conditioner casing is further provided with a rear seat floor vent communicating with the front seat floor vent.

To accomplish the above object, according to another aspect of the present invention, there is provided an air conditioner for a vehicle including: an air conditioner casing having a defrost vent, a face vent, and a front seat floor vent formed at outlets thereof in such a manner as to communicate with a mixing chamber and be adjusted in a degree of the opening thereof by means of respective mode doors and having left and right casings jointed to each other in such a manner as to be separated into left and right portions; an evaporator and a heater core each disposed at inside air passageways of the air conditioner casing; a front seat temperature adjusting door adapted to adjust a degree of the opening of the outlets of a cool air passageway and a warm air passageway of the air conditioner casing; a rear seat console vent disposed at the rear portion of the heater core; a partitioning wall having a communicating passageway adapted to make the warm air passageway communicate with the rear seat console vent; a console side cool air bypass passageway disposed along the bottom portion of the air conditioner casing under the lower portion of the heater core in such a manner as to make the cool air passageway communicate with the rear seat console vent; and a leaking warm air discharging passageway provided between the warm air passageway and the console side cool air bypass passageway in such a manner as to be passed through the left and right portions of the air conditioner casing and to isolate the console side cool air bypass passageway from the warm air passageway, for discharging the warm air leaking through a left and right joining portion of the air conditioner casing from the warm air passageway to the outside of the air conditioner casing.

According to the present invention, the air conditioner for a vehicle further includes a rear seat main temperature adjusting door adapted to adjust a degree of the opening of the inlet of the console side cool air bypass passageway and a degree of the opening of the inlet of the warm air passageway and a rear seat auxiliary temperature adjusting door adapted to adjust a degree of the opening of the communicating passageway.

According to the air conditioner for a vehicle of this invention, preferably, the inside air passageways of the air conditioner casing are each divided into left and right air passageways by means of a left and right partitioning wall.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 1*l* is a partly sectional view of FIG. 10; and

DETAILED DESCRIPTION OF THE PREFERRED EMBODIMENT

Reference will now be made in detail to the preferred embodiments of the present invention, examples of which are illustrated in the accompanying drawings. The terms and expressions used in the description and claims of this invention should be understood on the basis upon they are used to best explain this invention within the scope of the technical spirit of this invention.

Figure 1:
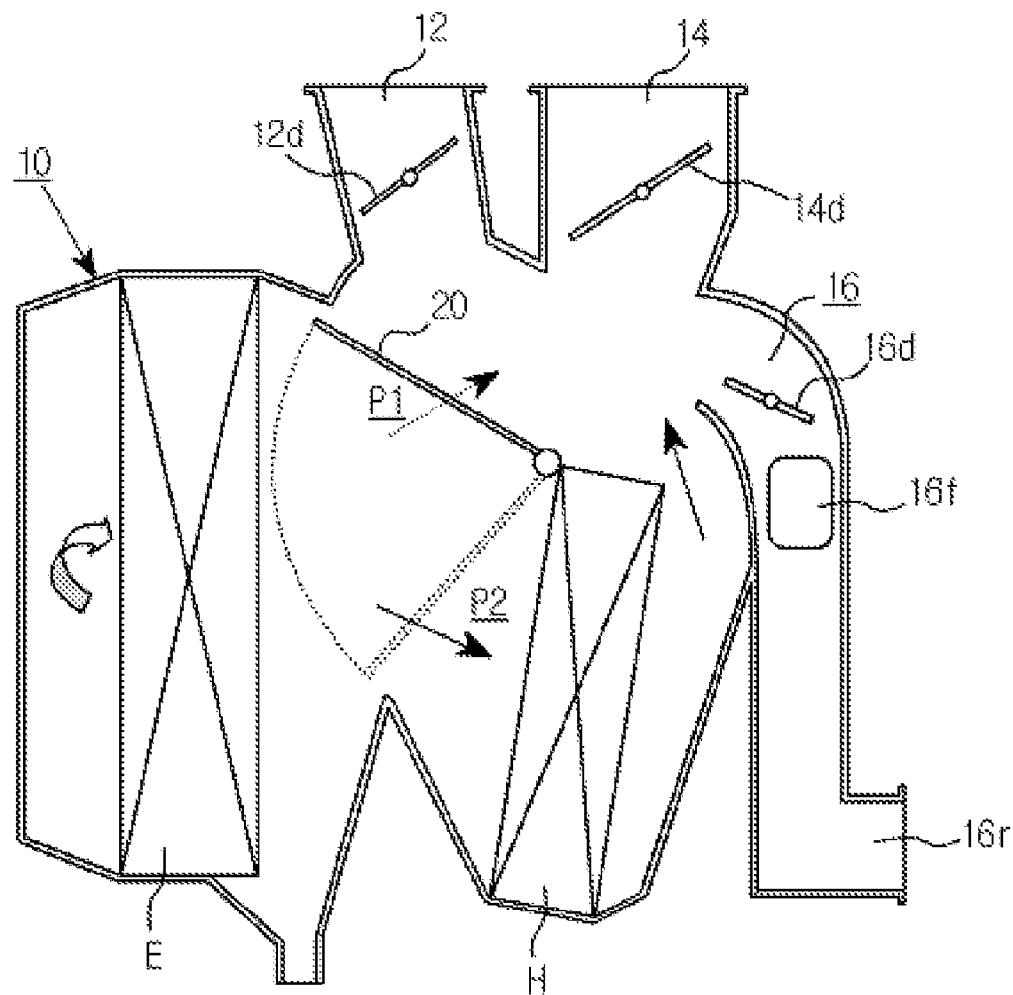
FIG. 1 is a sectional view showing a conventional air conditioner for a vehicle.
Figure 2:
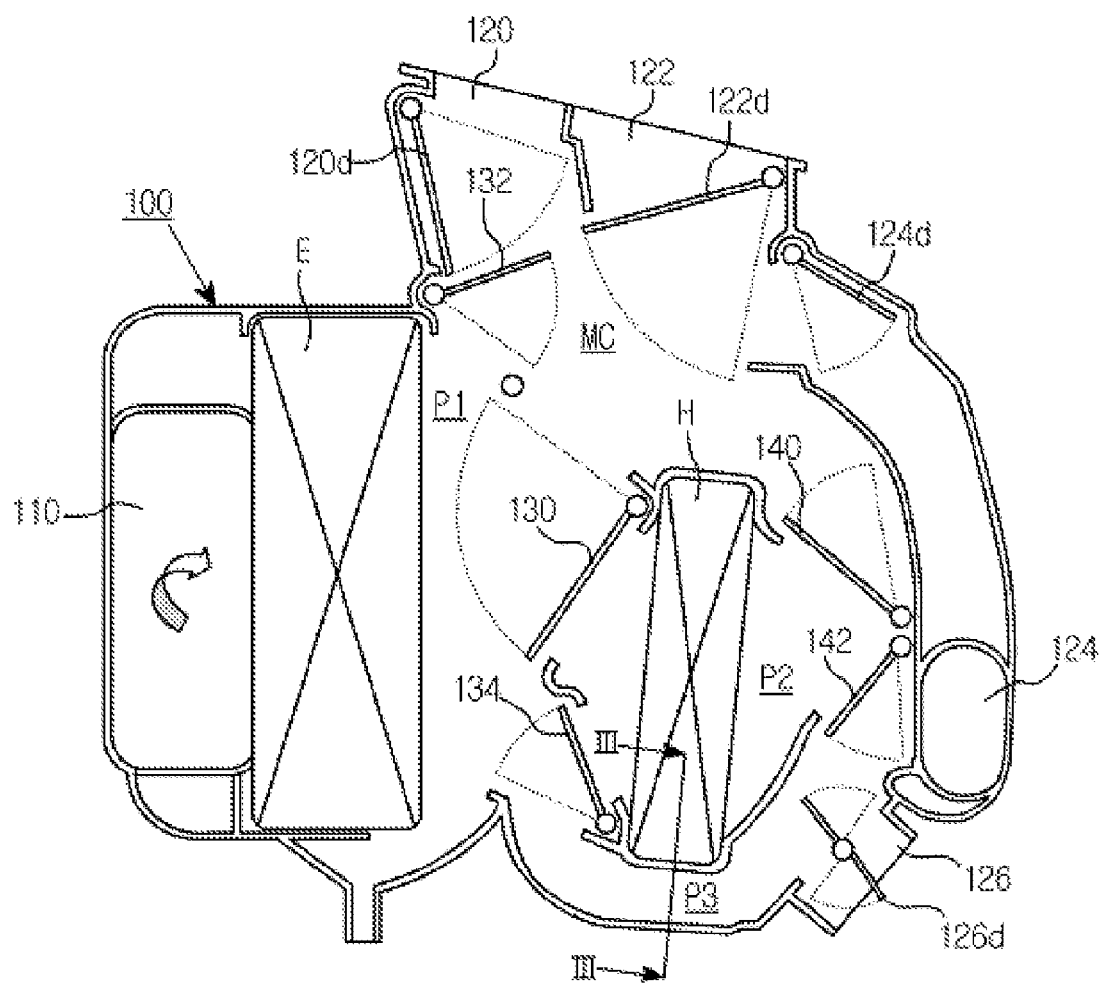
FIG. 2 is a sectional view showing another conventional air conditioner for a vehicle.
Figure 3:
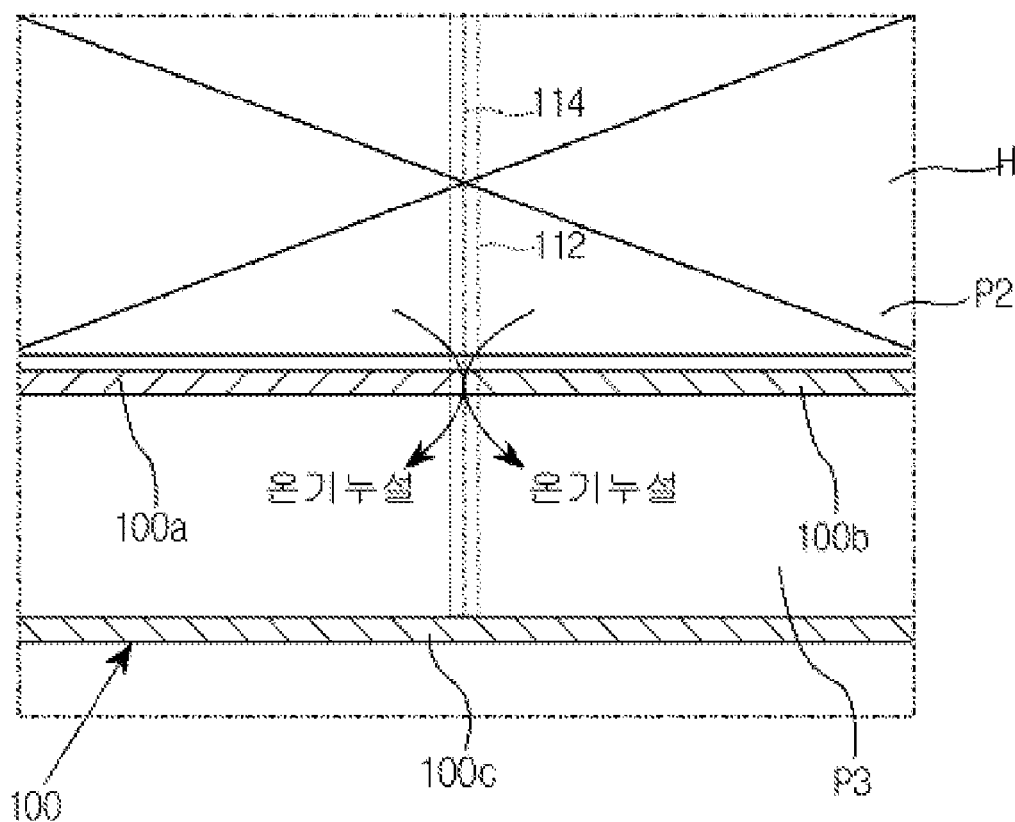
FIG. 3 is a partly sectional view taken along the line III-III of FIG. 2.
Figure 4:
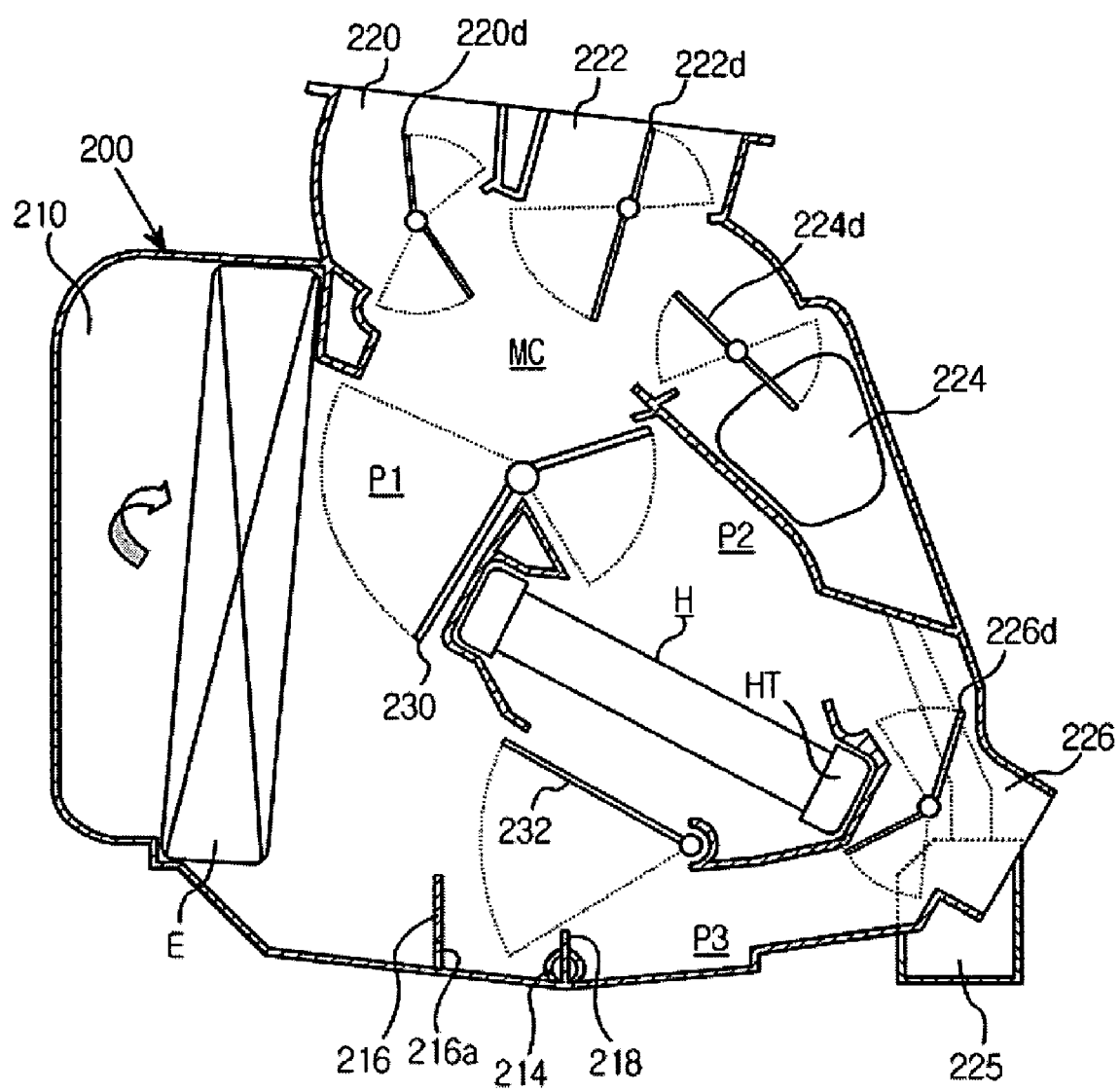
FIG. 4 is a sectional view showing an air conditioner for a vehicle according to an embodiment of the present invention.

FIG. 4 shows an air conditioner for a vehicle according to an embodiment of the present invention.

The air conditioner for a vehicle according to the present invention includes an air conditioner casing 200 and an evaporator E and a heater core H each disposed at the inside air passageways of the air conditioner casing 200.

The evaporator E is disposed vertically with respect to the air conditioner casing 200 in such a manner to be close at an inlet of the air conditioner casing 200. The heater core H is desirably disposed at the back of a warm air passageway P2 of the air conditioner casing 200 in such a manner as to be inclined downwardly.

A blower (which is not shown) is disposed at the inlet 210 of the air conditioner casing 200. Further, a plurality of vents 220, 222, 224, and 226 are disposed at the outlets of the air conditioner casing 200, for adjusting an amount of air discharging toward the inside of the vehicle. That is to say, the air conditioner casing 200 is provided with the defrost vent 220 for discharging air to the windows inside the vehicle, the face vent 222 for discharging air to the upper portion inside the vehicle, the front seat floor vent 224 for discharging air to the floor of the front seats inside the vehicle, and the rear seat floor vent 226 for discharging air to the floor of the rear seats inside the vehicle.

The vents 220, 222, and 224 communicate with a cool air passageway P1 and the warm air passageway P2 through a mixing chamber MC and their opening is adjusted by means of respective doors 220d, 222d, and 224d.

Figure 5:
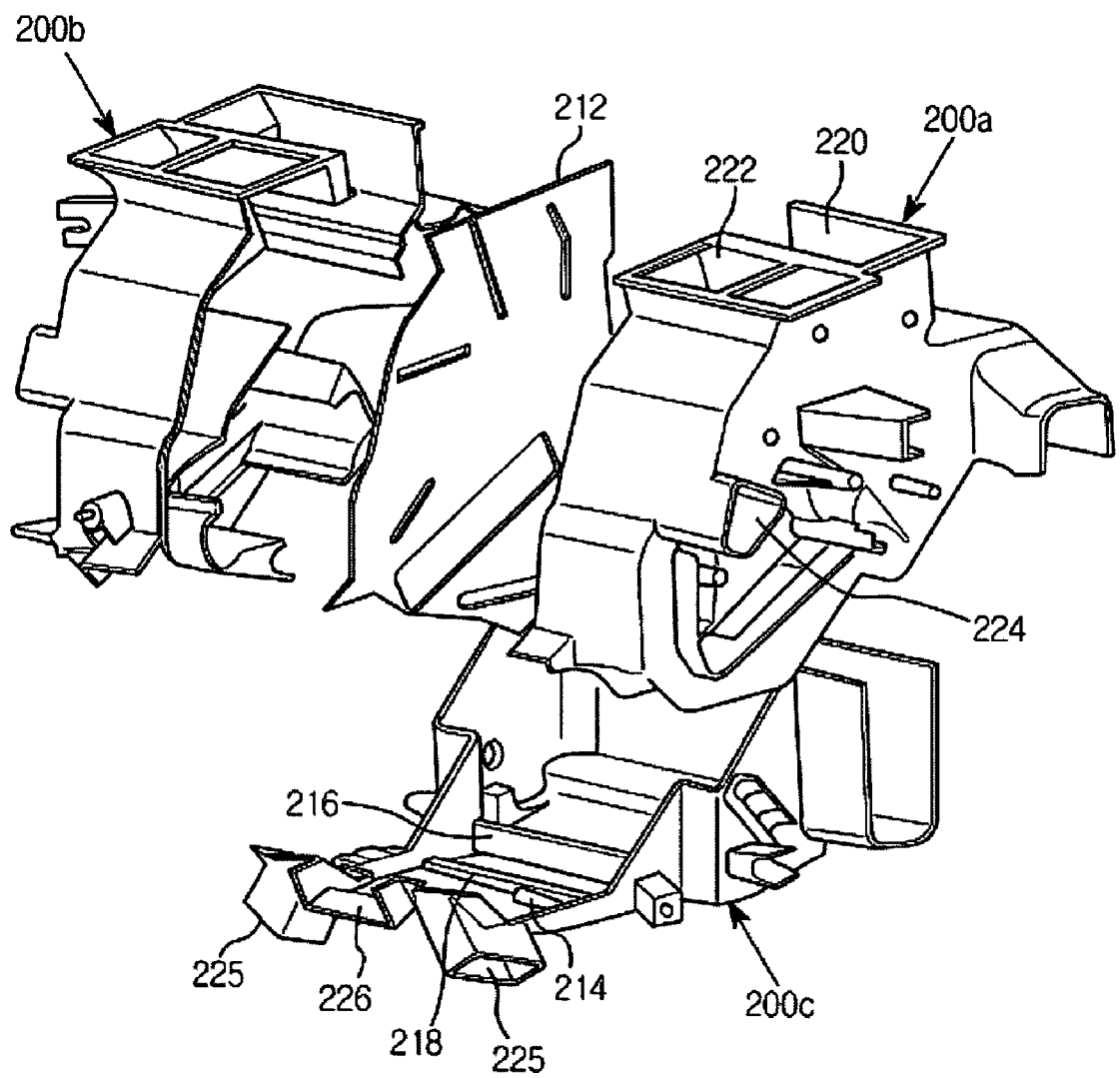
FIG. 5 is an exploded perspective view showing an air conditioner casing of the air conditioner for a vehicle according to the present invention.

The air conditioner casing 200, as shown in FIG. 5, includes left and right casings 200a and 200b joined to each other and a lower casing 200c coupled to the lower portions of the left and right casings 200a and 200b. In this case, the air conditioner casing 200 divides the inside air passageways into left and right space portions by means of a left and right partitioning wall 212. For example, the left and right partitioning wall 212 is disposed between the left and right casings 200a and 200b, such that only the inside area of the left and right casings 200a and 200b of the air conditioner casing 200 is divided into the left and right space portions, and otherwise, the left and right partitioning wall 212 is disposed between the left and right casings 200a and 200b in such a manner as to be passed through the middle portion of the lower casing 200c, as shown in FIG. 5, such that the inside air passageways of the air conditioner casing 200 are divided into the left and right space portions. That is to say, in the former case, the air conditioner casing 200 has three zones defined by the left/right space portions in the left and right casings 200a and 200b and by the lower space portion in the lower casing 200c, and in the latter case, the air conditioner casing 200 has four zones defined by the left/right space portions in the left and right casings 200a and 200b and by the lower left and right space portions in the lower casing 200c.

On the other hand, the rear seat console vent 226 communicates with the warm air passageway P2 where the heater core H is disposed and also communicates with the cool air passageway P1 at the downward stream of the evaporator E through the console side cool air bypass passageway P3 disposed along the bottom surface under the heater core H. The rear seat console vent 226 and the console side cool air bypass passageway P3 are formed in the lower casing 200c coupled to the lower portions of the left and right casings 200a and 200b.

Also, a degree of the opening of the rear seat console vent 226 is adjusted by means of the first rear seat auxiliary temperature adjusting door 226d. That is, a degree of the opening of the outlets of the warm air passageway P2 and the console side cool air bypass passageway P3 with respect to the rear seat console vent 226 is adjusted according to the turning angle of the first rear seat auxiliary temperature adjusting door 226d.

Further, so as to adjust the temperature of air passed through the evaporator E or the heater core H, the air conditioner casing 200 includes a front seat temperature adjusting door 230 for adjusting a degree of the opening of the outlets of the cool air passageway P1 and the warm air passageway P2 with respect to the mixing chamber MC and a rear seat main temperature adjusting door 232 for adjusting a degree of the opening of the inlets of the warm air passageway P2 and the console side cool air bypass passageway P3.

As mentioned above, the heater core H is disposed in such a manner as to be inclined downwardly at the rear side thereof, and the console side cool air bypass passageway P3 is disposed along the bottom surface of the air conditioner casing 200, such that the cool air gently flows through the console side cool air bypass passageway P3 toward the rear seat console vent 226. In this process, the heating of the cool air by means of the heater core H can be greatly suppressed, and the height of the air conditioner casing 200 can be greatly low.

Figure 9:
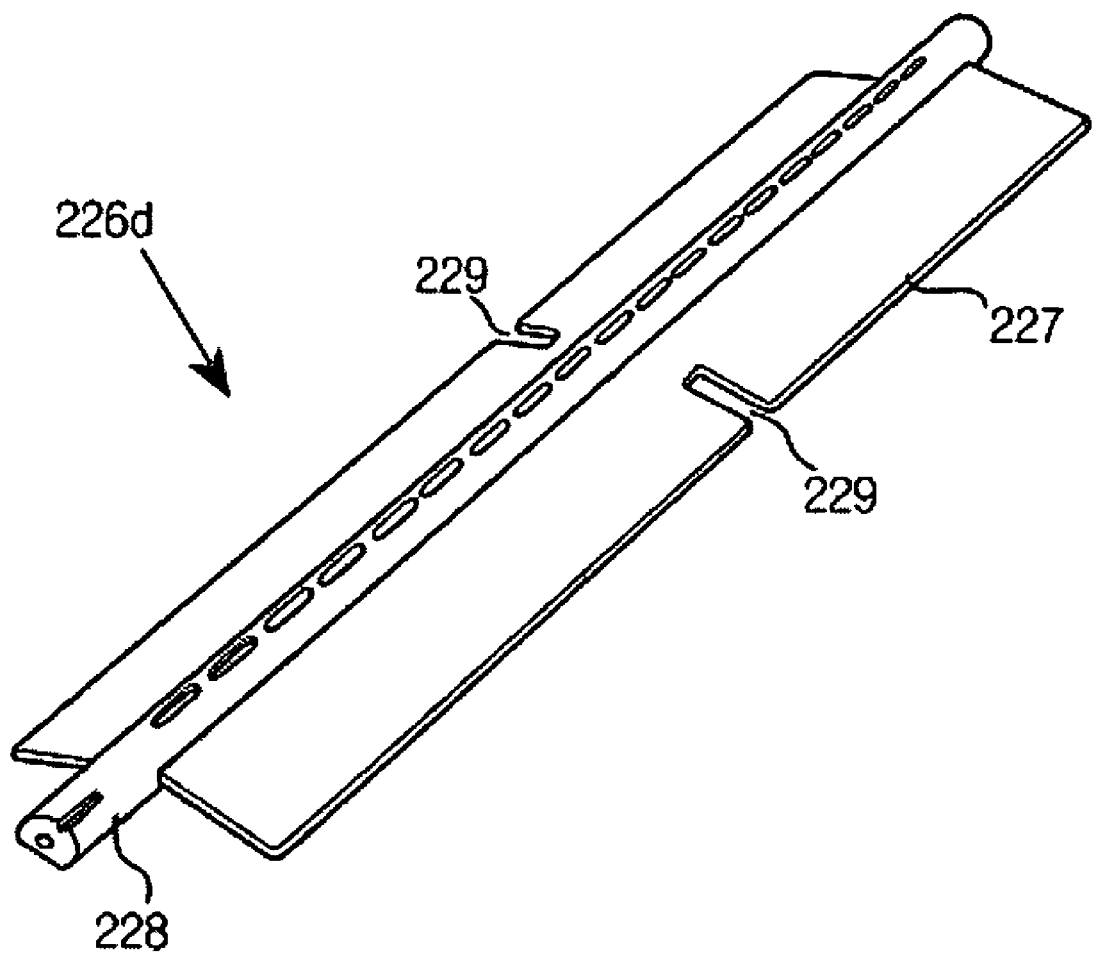
FIG. 9 is a perspective view showing a first rear seat auxiliary temperature adjusting door of the air conditioner for a vehicle according to another embodiment of the present invention.

The first rear seat auxiliary temperature adjusting door 226d is, as shown in FIGS. 4 and 9, formed in such a manner to have a center pivot structure where a door plate 227 is bent at a given angle and a door shaft 228 is mounted along the bent portion of the door plate 227. Further, a groove 229 is formed at the both middle end portions in a lengthwise direction with respect to the door plate 227, for inserting the end portions of the left and right partitioning wall 212 thereinto. However, if the first rear seat auxiliary temperature adjusting door 226d independently adjusting a degree of the opening is disposed at each of the left and right air passageways of the air conditioner casing 200 defined by the left and right partitioning wall 212, the formation of the groove 229 is not needed.

Also, in the case where the air conditioner casing 200 is defined in the left and right space portions by means of the left and right partitioning wall 212, the mode doors 220d, 222d, 224d adjusting a degree of the opening of the vents 220, 222, and 224, the front seat temperature adjusting door 230, the rear seat main temperature adjusting door 232, and the first rear seat auxiliary temperature adjusting door 226d are desirably disposed to independently adjust their opening with respect to each of the left and right air passageways defined in the left and right space portions.

Figure 6:
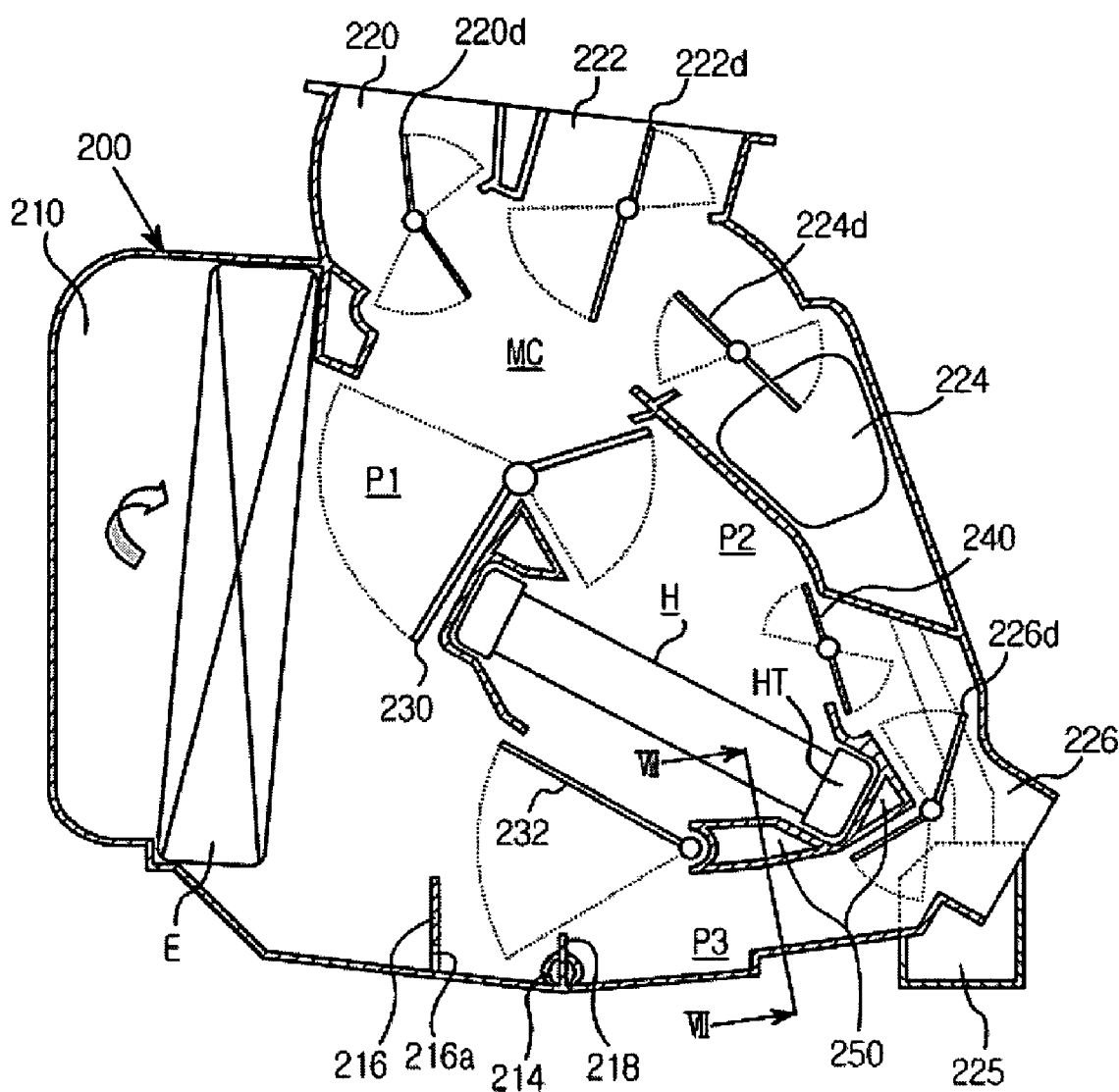
FIG. 6 is a sectional view showing an air conditioner for a vehicle according to another embodiment of the present invention.
Figure 7:
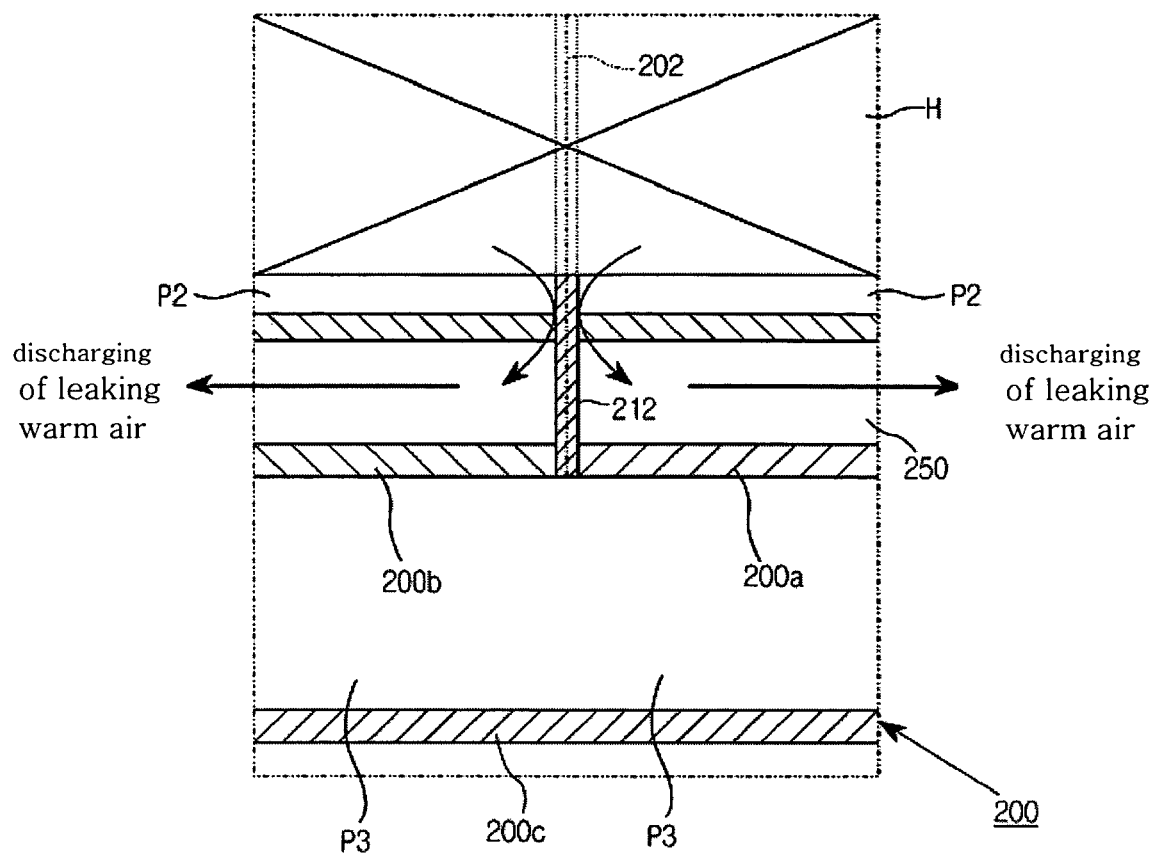
FIG. 7 is a sectional view taken along the line VII-VII of FIG. 6.
Figure 8:
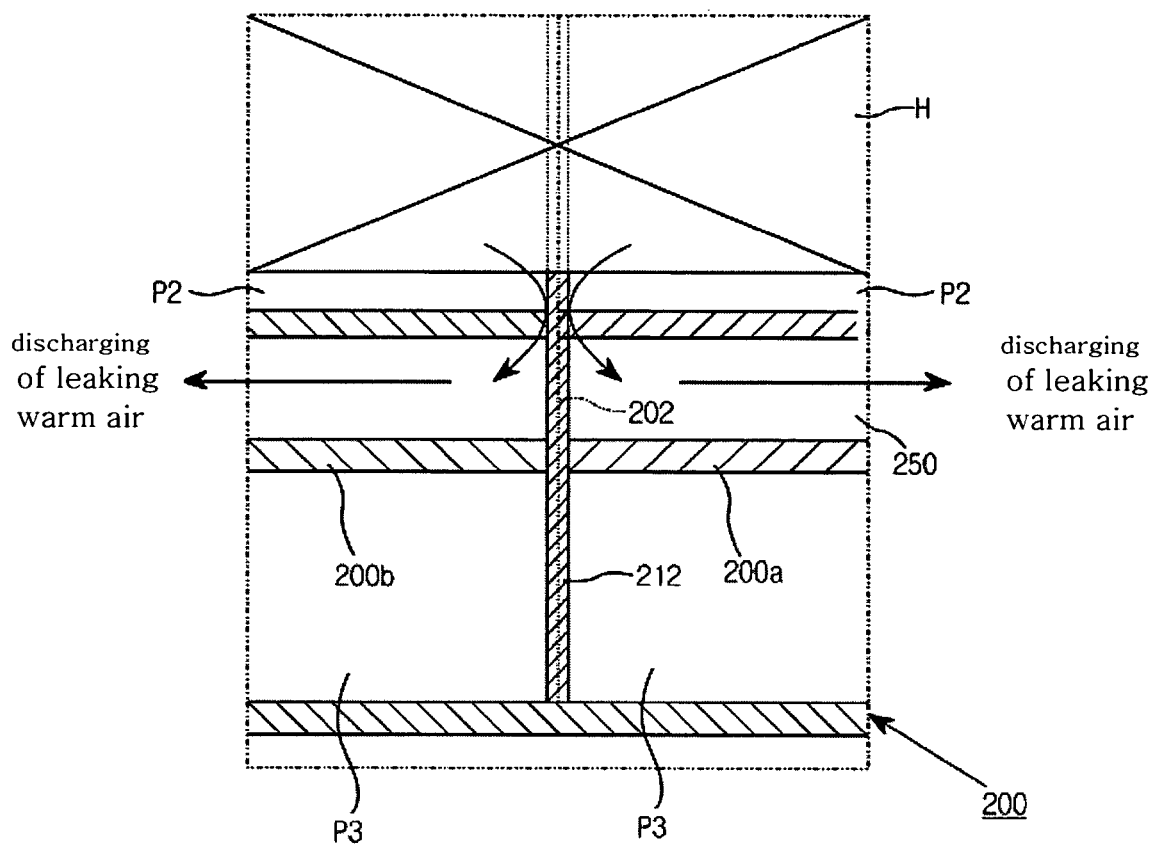
FIG. 8 is another sectional view taken along the line VII-VII of FIG. 6.

According to the present invention, the cool air flowing through the console side cool air bypass passageway P3 is mixed with the air leaking through the left and right joining portion 202 of the left and right casings 200a and 200b from the warm air passageway P2 and is thus heated. To effectively suppress the heating of the cool air, as shown in FIG. 6, a leaking warm air discharging passageway 250 is provided between the warm air passageway P2 and the console side cool air bypass passageway P3, for discharging the leaking warm air to the outside. As shown in FIGS. 7 and 8, that is to say, the leaking warm air discharging passageway 250 absorbs the warm air leaking through the left and right joining portion 202 of the left and right casings 200a and 200b from the warm air passageway P2 to discharge the absorbing warm air to the outside of the air conditioner casing 200, while isolating the console side cool air bypass passageway P3 from the warm air passageway P2. The leaking warm air discharging passageway 250 is formed in such a manner as to be defined in left and right portions by means of the left and right partitioning wall 212, as shown in FIGS. 7 and 8, and also, it may be formed in such a manner as to be passed through the left and right portions of the air conditioner casing 200. In this case, the left and right partitioning wall 212 has a hole formed to pass the leaking warm air discharging passageway 250 therethrough.

On the other hand, at the outlet of the warm air passageway P2, as shown in FIG. 6, is provided a second rear seat auxiliary temperature adjusting door 240 for adjusting a degree of the opening of the warm air passageway P2 with respect to the rear seat console vent 226. In this case, the second rear seat auxiliary temperature adjusting door 240 is operated in engagement by an interlocking means with the rear seat main temperature adjusting door 232, and if the rear seat main temperature adjusting door 232 closes the inlet of the warm air passageway P2, as shown in FIG. 6, the second rear seat auxiliary temperature adjusting door 240 closes the outlet of the warm air passageway P2 with respect to the console vent 226. To the contrary, if the rear seat main temperature adjusting door 232 opens the inlet of the warm air passageway P2, the second rear seat auxiliary temperature adjusting door 240 opens the outlet of the warm air passageway P2 with respect to the console vent 226. Also, in the case where the air conditioner casing 200 is defined in the left and right space portions by means of the left and right partitioning wall 212, the second rear seat auxiliary temperature adjusting door 240 is desirably disposed to independently adjust a degree of the opening with respect to each of the left and right air passageways.

Therefore, in a case where a full cooling mode is set with respect to the front and back areas inside the vehicle, if the second rear seat auxiliary temperature adjusting door 240 is not employed as shown in FIG. 4, the outlet of the warm air passageway P2 is closed with respect to the rear seat console vent 226 by the operation of the first rear seat auxiliary temperature adjusting door 226d, thereby preventing the warm air from leaking to the rear seat console vent 226. However, if the second rear seat auxiliary temperature adjusting door 240 is employed as shown in FIG. 6, the outlet of the warm air passageway P2 is fully closed with respect to the rear seat console vent 226 by the operations of the first and second rear seat auxiliary temperature adjusting doors 226d and 240, thereby more effectively preventing the warm air from leaking to the rear seat console vent 226.

On the other hand, as shown in FIGS. 4 to 6, on the console side cool air bypass passageway P3 is provided a condensed water discharging outlet 214 that serves to discharge condensed water generated from the evaporator E and flowing through the console side cool air bypass passageway P3 to the outside of the air conditioner casing 200. Further, at the bottom of the inlet of the console side cool air bypass passageway P3 is provided a first partition 216 that serves to prevent the pressure at an area between the evaporator E and the console side cool air bypass passageway P3 from being excessively varied by the operation of the rear seat main temperature adjusting door 232, and the first partition 216 has a condensed water through hole 216a formed at the lower end thereof. Further, at the bottom of the inlet of the console side cool air bypass passageway P3 is provided a second partition 218 that serves to prevent water from overflowing backwardly when the vehicle is driven on hills. In this case, preferably, the second partition 218 is formed in such a manner as to define the front and back sides of the condensed water discharging outlet 214.

On the other hand, as shown in FIGS. 4 to 6, the air conditioner casing 200 is further provided with a rear seat floor vent 225 that communicates with the front seat floor vent 224. For example, as shown in FIG. 5, the rear seat console vent 226 is disposed in the middle portion of the air conditioner casing 200 and the rear seat floor vent 225 is disposed at the both sides with respect to the front seat console vent 226, respectively, when the air conditioner casing 200 is viewed at the rear side thereof.

Figure 10:
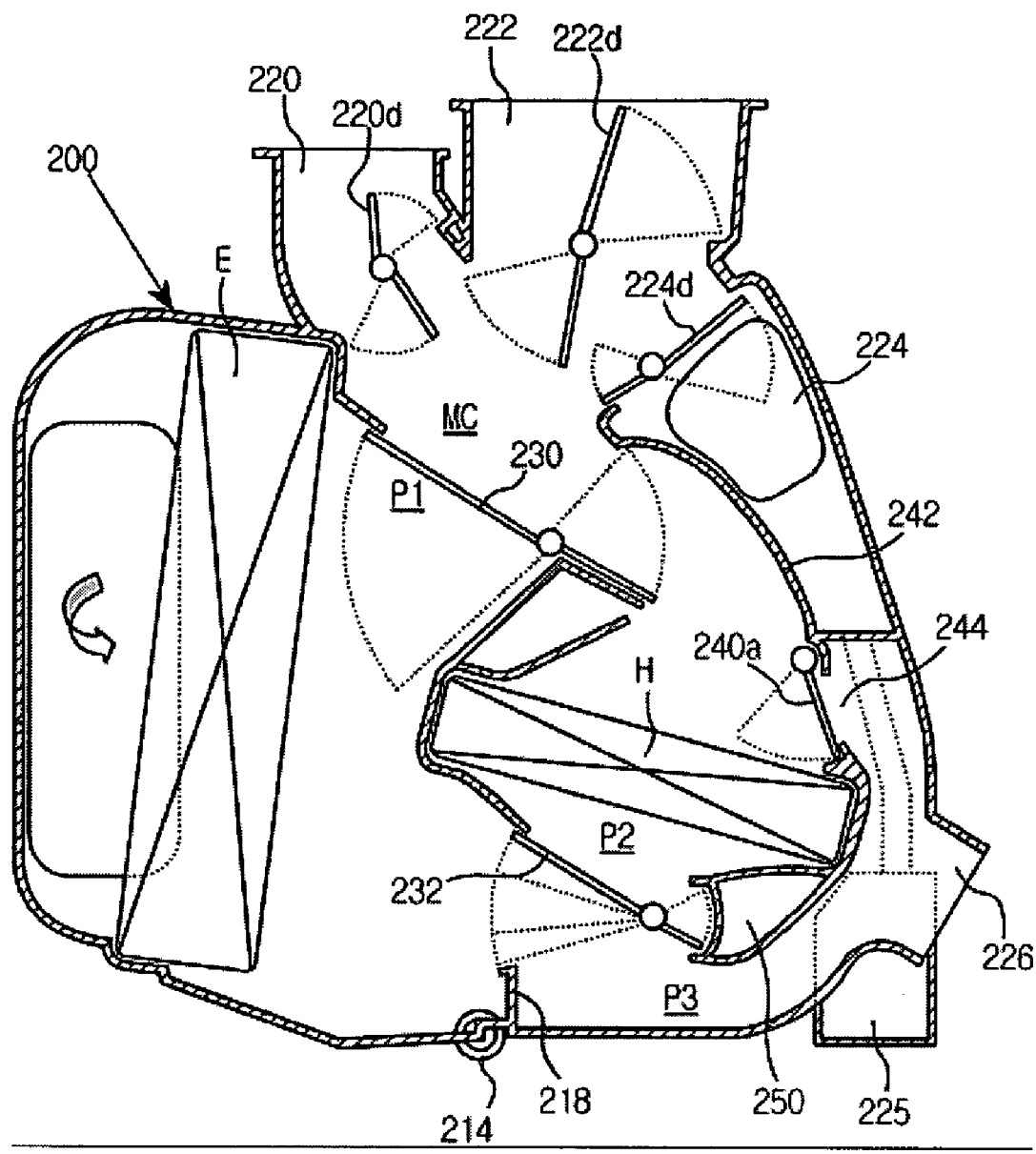
FIG. 10 is a sectional view showing an air conditioner for a vehicle according to still another embodiment of the present invention.
Figure 11:
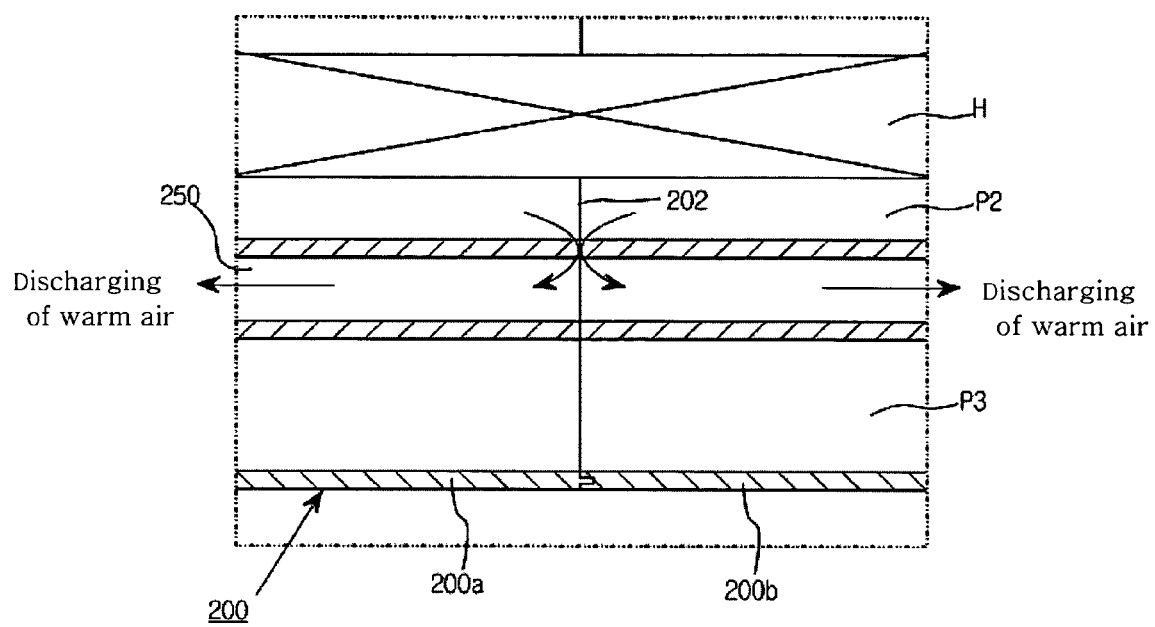
Figure 12:
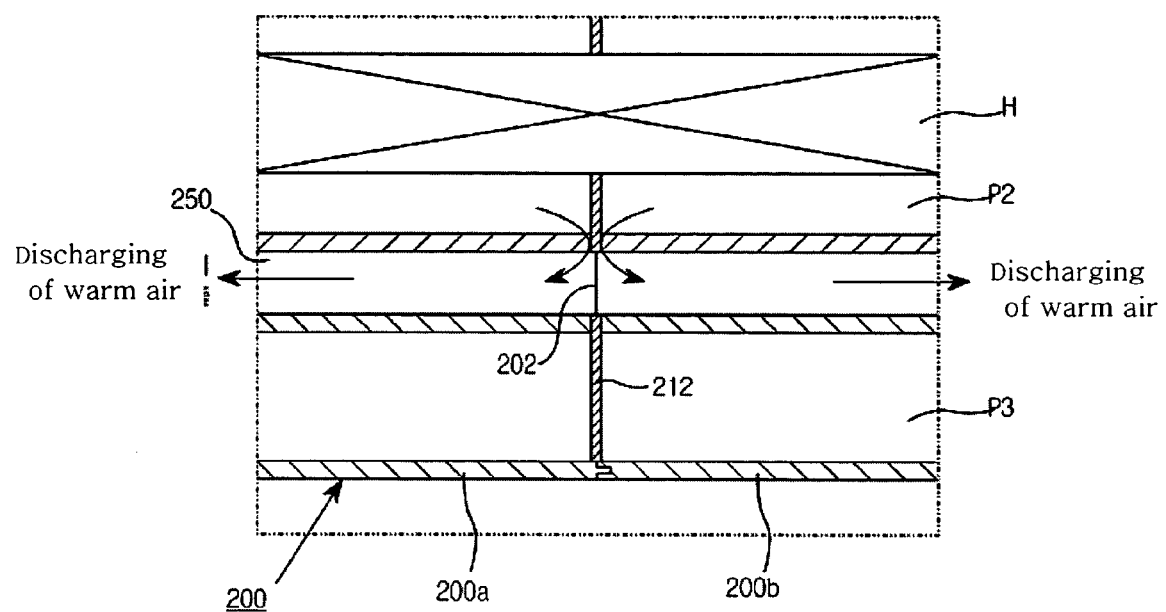
FIG. 12 is another partly sectional view of FIG. 10.

Meanwhile, FIGS. 10 and 12 show an air conditioner for a vehicle according to a third embodiment of the present invention.

As shown, the air conditioner of the present invention includes: an air conditioner casing 200 having a defrost vent 220, a face vent 222, and a front seat floor vent 224 formed at outlets thereof in such a manner as to communicate with a mixing chamber MC and be adjusted in a degree of the opening thereof by means of respective mode doors 220d, 222d, and 224d and having left and right casings 200a and 200b jointed to each other in such a manner as to be separated into left and right portions; an evaporator E and a heater core H disposed at inside air passageways of the air conditioner casing 200; a front seat temperature adjusting door 230 adapted to adjust a degree of the opening of the outlets of a cool air passageway P1 and a warm air passageway P2 of the air conditioner casing 200; a rear seat console vent 226 disposed at the rear portion of the heater core H; a partition 242 having a communicating passageway 244 adapted to make the warm air passageway P2 communicate with the rear seat console vent 226; a console side cool air bypass passageway P3 disposed along the bottom portion of the air conditioner casing 200 under the lower portion of the heater core H of the air conditioner casing 200 in such a manner as to make the cool air passageway P1 communicate with the rear seat console vent 226; and a leaking warm air discharging passageway 250 provided between the warm air passageway P2 and the console side cool air bypass passageway P3 in such a manner as to be passed through the left and right portions of the air conditioner casing 200 and to isolate the console side cool air bypass passageway P3 from the warm air passageway P2, for discharging the warm air leaking through a left and right joining portion 202 of the air conditioner casing 200 from the warm air passageway P2 to the outside of the air conditioner casing 200.

In the air conditioner according to the third embodiment of the present invention, a degree of the opening of the inlet of the console side cool air bypass passageway P3 and a degree of the opening of the inlet of the warm air passageway P2 are adjusted by means of the rear seat main temperature adjusting door 232. Further, a degree of the opening of the communicating passageway 244 is adjusted by means of the rear seat auxiliary temperature adjusting door 240a. The partition 242 defines the warm air passageway P2 at the downstream side of the heater core H, the front seat floor vent 224, and the rear seat console vent 226, and a rear seat floor vent 225 is further provided in such a manner as to communicate with the front seat floor vent 224.

In the air conditioner according to the third embodiment of the present invention, as shown in FIG. 12, the inside air passageways of the air conditioner casing 200 are defined as left and right air passageways by means of the left and right partitioning wall 212.

Since the parts of the air conditioner casing 200 that are not explained in FIGS. 10 and 12 are similar to or the same as those described in FIGS. 4 to 9, an explanation of them will be avoided for the brevity of this description.

The air conditioner for a vehicle according to the second embodiment of the present invention has the same construction as that according to the first embodiment of the present invention, except that the first rear seat auxiliary temperature adjusting door 226d as shown in FIG. 6 is not disposed therein. That is to say, in the case of the air conditioner as shown in FIG. 6, an amount of air blowing from the rear seat console vent 226 is adjusted by means of the first rear seat auxiliary temperature adjusting door 226d, but in the case of the air conditioner as shown in FIG. 10, it is adjusted by means of the rear seat main temperature adjusting door 232 or the rear seat auxiliary temperature adjusting door 240a.

Next, an explanation of the air conditioner for a vehicle according to the preferred embodiments of the present invention is given below.

According to the air conditioner for a vehicle as shown in FIGS. 4 and 6, in a case where the rear seat console vent 226 is opened to make the front and rear areas of the vehicle set in a full cooling mode, the rear seat main temperature adjusting door 232 is operated to close the inlet of the console side cool air bypass passageway P3 and the inlet of the warm air passageway P2. Also, the first rear seat auxiliary temperature adjusting door 226d is operated to close the outlet of the warm air passageway P2 with respect to the rear seat console vent 226. According to the air conditioner as shown in FIG. 6 or 10, if the second rear seat auxiliary temperature adjusting door 240 or the rear seat auxiliary temperature adjusting door 240a is provided therein to communicate with the rear seat main temperature adjusting door 232, it is operated to close the outlet of the warm air passageway P2 with respect to the rear seat console vent 226. Also, the front seat temperature adjusting door 230 is operated to open the cool air passageway P1 and to close the outlet of the warm air passageway P2. Further, the vents 220, 222, and 224 are selectively opened according to the air discharging mode.

At this state, the cool air passageway P1 at the downstream of the evaporator E communicates with the rear seat console vent 226 through the console side cool air bypass passageway P3, such that the cool air heat-exchanged through the evaporator E flows toward the rear seat console vent 226 through the console side cool air bypass passageway P3 and is discharged to the rear seats inside the vehicle, which makes the rear seats cooled.

On the other hand, as the warm air passageway P2 is closed, the cool air that has been passed through the evaporator E is not supplied to the heater core H. Therefore, the cool air passed through the evaporator E flows to the mixing chamber MC through the outlet of the cool air passageway P1 and is then discharged to the inside of the vehicle through the opened vents, which makes the front seats cooled. In the case where the air conditioner casing 200 is divided into the left and right portions by the formation of the left and right partitioning wall 212 such that the left and right air passageways thereof are adjusted in their opening by means of their respective doors, the cooling control is possible independently with respect to the left and right portions inside the vehicle.

In the process of the full cooling mode, since the heater core H is formed inclined downwardly and the console side cool air bypass passageway P3 is formed along the bottom surface of the air conditioner casing 200, the cool air flows gently to the rear seat console vent 226 through the console side cool air bypass passageway P3, while not heated by the heater core H.

Also, according to the air conditioner as shown in FIGS. 6 and 10, since the leaking warm air discharging passageway 250 serves to isolate the console side cool air bypass passageway P3 from the warm air passageway P2, the warm air leaking from the gap of the left and right joining portion 202 of the air conditioner casing 200 flowing from the warm air passageway P2 enters the leaking warm air discharging passageway P3. Next, the leaking warm air is discharged to the outside of the air conditioner casing 200, thereby preventing the cool air flowing through the console side cool air bypass passageway P3 from being raised in temperature thereof by the heat transmission of the leaking warm air and the heater core H.

In the case where the leaking warm air discharging passageway 250 is disposed around a header tank HT area at the rear side of the heater core H, the rear seat console vent 226 is isolated from the rear side header tank HT, thereby more effectively preventing the temperature of the cool air from being raised.

Moreover, the warm air that is transmitted through a wall surface from the header tank HT at the rear side of the heater core H is cut off by means of the first rear seat auxiliary temperature adjusting door 226d disposed at the rear portion of the wall surface, and in the case where the second rear seat auxiliary temperature adjusting door 240 is disposed in the air conditioner casing 200, it also keeps the cool air from leaking toward the rear seat console vent 226 through the warm air passageway P2, thereby preventing the cool air at the rear seat console vent 226 from being raised once again.

On the other hand, according to the air conditioner for a vehicle as shown in FIGS. 4 and 5, in a case where a full heating mode where the rear seat console vent 226 is opened is set, the first rear seat auxiliary temperature adjusting door 226d is operated to close the outlet of the console side cool air bypass passageway P3 and to open the warm air passageway P2 with respect to the rear seat console vent 226 (which is shown by the dotted line in FIGS. 4 and 6). Also, the rear seat main temperature adjusting door 230 is operated to close the outlet of the cool air passageway P1 and to open the outlet of the warm air passageway P2 with respect to the mixing chamber MC (which is shown by the dotted line in FIGS. 4 and 6 and shown by the solid line in FIG. 10). And, the activation of the cooling cycle through the evaporator E stops.

Therefore, as the console side cool air bypass passageway P3 is closed such that the cool air passageway P1 at the downstream of the evaporator E does not communicate with the rear seat console vent 226, the air that has been passed through the evaporator E does not flow to the console side cool air bypass passageway P3 but flows to the heater core H through the warm air passageway P2. A part of the warm air that has been passed through the heater core H is passed through the mixing chamber MC and then discharged through the opened vent according to the set air discharging mode to the inside of the vehicle, thereby conducting the heating operation in the inside of the vehicle, and the rest of warm air that has been passed through the heater core H is discharged through the rear seat console vent 226 to the inside of the vehicle, thereby conducting the heating operation in the inside of the vehicle.

In the process of the full heating mode, according to the air conditioner for a vehicle as shown in FIGS. 4 and 6, the console side cool air bypass passageway P3 is closed double by means of the rear seat main temperature adjusting door 232 and the first rear seat auxiliary temperature adjusting door 226d, thereby effectively preventing the air passed through the evaporator E from leaking to the rear seat console vent 226 through the console side cool air bypass passageway P3.

Also, in the case where the air conditioner is activated in a temperature adjusting mode upon cooling or heating, the air passageways are selectively adjusted in their opening by means of the doors according to the set mode, the temperature of air, the direction of air blowing, and the amount of air blowing are adjusted.

On the other hand, in a case where the air conditioner is activated in a cooling mode, the condensed water generated from the evaporator E flows through the condensed water through hole 216a of the first partition 216 and is then discharged through the front portion of the second partition 218 of the condensed water discharging outlet 214, and the water generated by the cool air flowing through the console side cool air bypass passageway P3 is discharged through the back portion of the second partition 218 of the condensed water discharging outlet 214.

Also, in the case where the air conditioner is activated in the cooling mode, the first partition 216 serves to prevent the pressure at an area between the evaporator E and the console side cool air bypass passageway P3 from being excessively varied by the operation of the rear seat main temperature adjusting door 232. Furthermore, when the vehicle is driven on hills, the second partition 218 serves to prevent the water flowing toward the condensed water discharging outlet 214 from overflowing to the back side of the console side cool air bypass passageway P3 at the front side thereof.

As mentioned above, according to the air conditioner for a vehicle according to the preferred embodiments of the present invention, upon the full cooling mode, the structures of isolating the console side cool air bypass passageway P3 from the warm air passageway P2, disposing the heater core H, discharging the warm air leaking from the warm air passageway P2, and cutting off the leakage of the warm air from the warm air passageway P2 toward the rear seat console vent 226 completely prevent the cool air that has been discharged through the console side cool air bypass passageway P3 and the rear seat console vent 226 from being heated by the heat of the heater core H or the temperature of the leaking warm air, thereby enhancing the cooling performance.

Additionally, the console side cool air bypass passageway P3 is formed along the bottom surface of the air conditioner casing 200 in a structure where no air flowing resistance exists, while not being influenced by the mounting structure of the heater core H, thereby discharging a substantially amount of cool air to the rear seats of the inside of the vehicle.

In the process of the full heating mode where the rear seat console vent 226 is opened, the console side cool air bypass passageway P3 is closed double by means of the rear seat main temperature adjusting door 232 and the first rear seat auxiliary temperature adjusting door 226d, thereby effectively preventing the air passed through the evaporator E from leaking to the rear seat console vent 226 through the console side cool air bypass passageway P3, which enhances the heating performance.

Also, the number of doors for adjusting the temperature is reduced, and the number of door driving means like an actuator is accordingly reduced, which makes the structure of the air conditioner more simplified.

Further, the formation of the first partition 216 prevents the pressure at an area between the evaporator E and the console side cool air bypass passageway P3 from excessively varied by the operation of the rear seat main temperature adjusting door 232.

Furthermore, when the vehicle is driven on hills, the formation of the second partition 218 prevents the water flowing toward the condensed water discharging outlet 214 from overflowing to the back side of the console side cool air bypass passageway P3, thereby keeping the water from flowing to the inside of the vehicle.

While the present invention has been described with reference to the particular illustrative embodiments, it is not to be restricted by the embodiments but only by the appended claims, and therefore, it is to be understood that other modifications and variations may be made without departing from the substance and scope of the present invention, as those skilled in the art will readily understand. Such alternate modifications and variations are within the scope of the present invention which is intended to be limited only by the appended claims and equivalents thereof.

What is claimed is:

1. An air conditioner for a vehicle comprising:
an air conditioner casing having a defrost vent, a face vent, and a front seat floor vent formed at outlets thereof in such a manner as to communicate with a mixing chamber and be adjusted in a degree of the opening thereof by means of respective mode doors, having left and right casings joined to each other in such a manner as to be separated into left and right portions, and having a lower casing coupled to the lower portions of the left and right casings;
an evaporator and a heater core each disposed at inside air passageways of the air conditioner casing;
a rear seat console vent adapted to communicate with a warm air passageway having the heater core disposed therein and to communicate with a cool air passageway through a console side cool air bypass passageway disposed along the bottom surface of the air conditioner casing under the lower side of the heater core;
a front seat temperature adjusting door adapted to adjust a degree of the opening of the outlets of the cool air passageway and the warm air passageway with respect to the mixing chamber;
a rear seat main temperature adjusting door adapted to adjust a degree of the opening of the inlets of the warm air passageway and the console side cool air bypass passageway;
a first rear seat auxiliary temperature adjusting door adapted to adjust a degree of the opening of the outlets of the warm air passageway and the console side cool air bypass passageway with respect to the rear seat console vent, and
a leaky warm air discharging passageway connected in fluid flow relation between the warm air passageway and the console side cool air bypass passageway, the leaky warm air discharging passageway being connected and arranged for isolating the console side cool air bypass passageway from the warm air passageway, for discharging the warm air leaking through a left and right joining portion of the left and right casings from the warm air passageway to the outside of the air conditioner casing.

2. An air conditioner for a vehicle according to claim 1, further comprising a second rear seat auxiliary temperature adjusting door adapted to adjust a degree of the opening of the warm air passageway with respect to the rear seat console vent.

3. An air conditioner for a vehicle according to claim 2, wherein the second rear seat auxiliary temperature adjusting door is operated to close the outlet of the warm air passageway in engagement with the rear seat main temperature adjusting door by an interlocking means if the rear seat main temperature adjusting door closes the inlet of the warm air passageway, and opens the outlet of the warm air passageway with respect to the console vent if the rear seat main temperature adjusting door is operated to open the inlet of the warm air passageway.

4. An air conditioner for a vehicle according to claim 1, wherein the first rear seat auxiliary temperature adjusting door has a center pivot rotary shaft.

5. An air conditioner for a vehicle according to claim 1, wherein at the bottom of the inlet of the console side cool air bypass passageway a first partition is disposed for preventing the pressure at an area between the evaporator and the console side cool air bypass passageway from being excessively varied by the operation of the rear seat main temperature adjusting door, the first partition having a condensed water through hole formed at the lower end thereof.

6. An air conditioner for a vehicle according to claim 5, wherein at the bottom of the inlet of the console side cool air bypass passageway a second partition is disposed for preventing water from overflowing backwardly when the vehicle is driven on hills.

7. An air conditioner for a vehicle according to claim 6, wherein the second partition is formed in such a manner as to divide into the front and back sides of a condensed water discharging outlet formed at the console side cool air bypass passageway for discharging the condensed water generated from the evaporator and flowing through the console side cool air bypass passageway to the outside of the air conditioner casing.

8. An air conditioner for a vehicle according to claim 1, wherein a left and right partitioning wall is disposed between the left and right casings such that the internal space of the left and right casings is divided into left and right space portions.

9. An air conditioner for a vehicle according to claim 1, wherein a left and right partitioning wall is disposed between the left and right casings in such a manner as to be passed through the middle portion of the lower casing such that the internal space of the left and right casings and the internal space of the lower casing are each divided into left and right space portions.

10. An air conditioner for a vehicle according to claim 8, wherein the internal air passageways of the air conditioner casing are divided into the left and right space portions by means of the left and right partitioning wall, each of the doors being disposed for independently adjusting a degree of the opening with respect to the air passageways divided in the left and right space portions of the air conditioner casing,
wherein each of the doors is individually disposed on the air passageways to independently adjust a degree of the opening thereof in the left and right space portions of the air conditioner casing which are divided by the left and right partitioning wall.

11. An air conditioner for a vehicle according to claim 9, wherein the internal air passageways of the air conditioner casing are divided into the left and right space portions by means of the left and right partitioning wall, each of the doors being disposed for independently adjusting a degree of the opening with respect to the passages divided in the left and right space portions of the air conditioner casing,
wherein each of the doors is individually disposed on the air passageways to independently adjust a degree of the opening thereof in the left and right space portions of the air conditioner casing which are divided by the left and right partitioning wall.

12. An air conditioner for a vehicle according to claim 1, wherein the heater core is disposed at the warm air passageway in such a manner as to be inclined downwardly at the back portion thereof.

13. An air conditioner for a vehicle according to claim 1, wherein the air conditioner casing is further provided with a rear seat floor vent communicating with the front seat floor vent.

* * * * *